Patented June 24, 1930

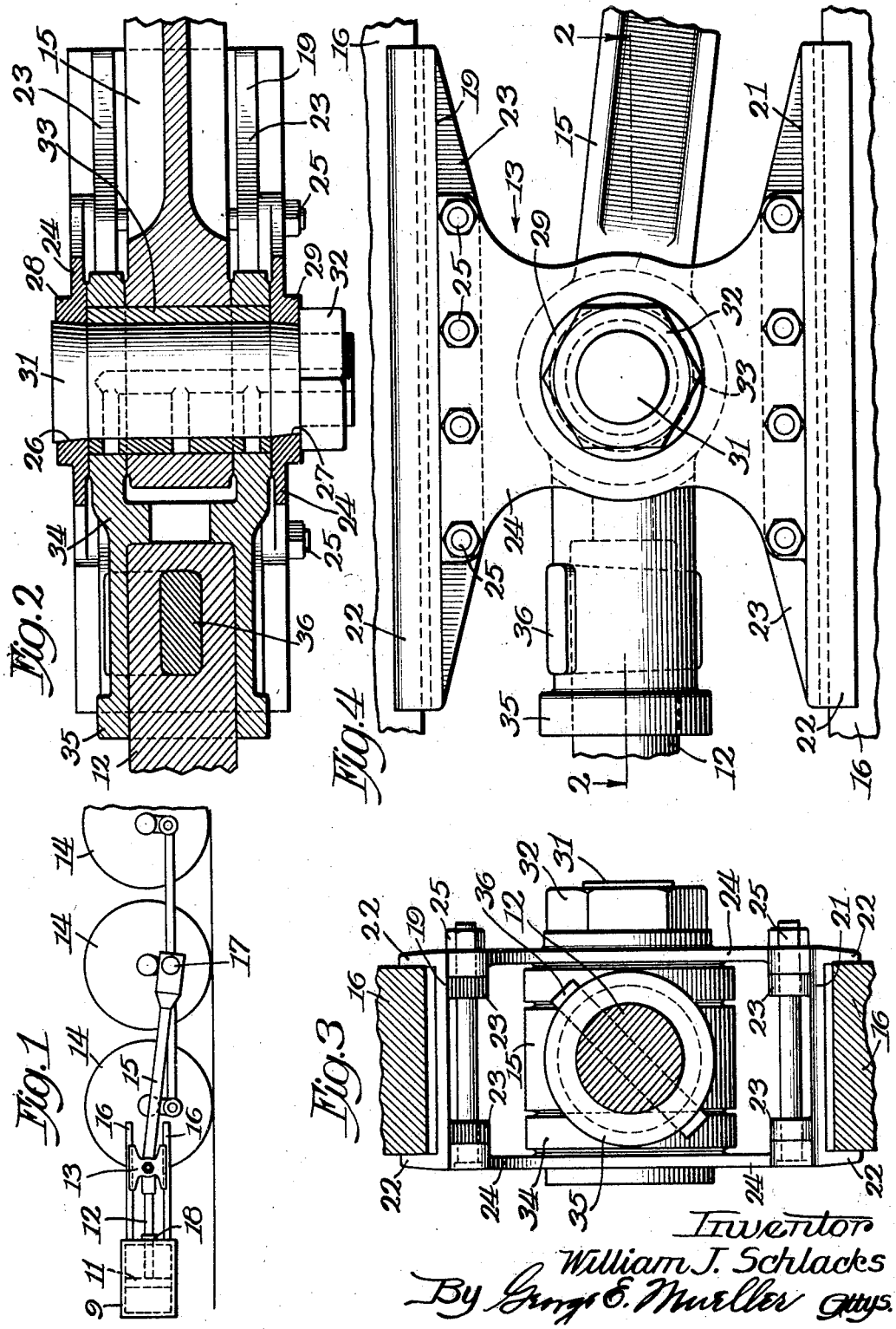

1,767,484

UNITED STATES PATENT OFFICE

WILLIAM J. SCHLACKS, OF CHICAGO, ILLINOIS

LOCOMOTIVE PISTON-ROD CROSSHEAD CONNECTION

Application filed July 5, 1929. Serial No. 376,031.

My invention relates to a locomotive engine, and more particularly to the crosshead construction of a locomotive engine.

Certain problems arise in connection with locomotive engines, which are not encountered in smaller or stationary engines, or which, if present in such engines, are readily overcome by means which are not applicable to locomotive engines.

Modern locomotive development has introduced many new problems, one of the gravest of which at the present time is to overcome the frequent piston rod breakages which have occurred in recent years. In order to overcome such breakages the railroads have employed high duty alloy steel piston rods but still fractures occur. The situation is so grave that periodic inspections, as frequent as once a month, are required. These inspections necessitate removing the piston rod from the crosshead fit, and this always results in a less effective fit, and is aggravated every time the connection is disturbed.

Accordingly one of the principal objects of the present invention is to overcome this condition.

A further object is to provide a crosshead construction which reduces the strain on the piston rod.

A further object is to provide a crosshead which will increase the life of the piston rod.

A further object is to provide a crosshead construction for a locomotive engine which reduces the wear between the piston head and cylinder of the engine.

A further object is to provide a crosshead for a locomotive, in which the wrist pin bearing in the crosshead is subjected only to vertical forces.

A further object is to provide a crosshead in which the piston does not transmit the driving power of the engine to the wrist pin through the crosshead.

Other objects and advantages of the invention will appear from the following description taken in connection with the accompanying drawings, wherein Fig. 1 is a schematic view of a portion of a locomotive engine embodying my invention;

Fig. 2 is a cross section taken on line 2—2 of Fig. 4;

Fig. 3 is an end view of a crosshead, showing the piston rod in section, and

Fig. 4 is a side elevation of a crosshead.

In analyzing the problem resulting in the present invention, I found that ninety-seven per cent of the failures in the piston rods occur just outside or immediately inside the juncture with the crosshead. From these facts I deduced that breakages were undoubtedly due to relative movement between the crosshead and piston rod which would of course take place as a torsion or bending of the rod. I accounted for this fact as follows:

The recent developments in high steam pressure and long stroke pistons have placed a greater and greater load on the cross head. The use of superheated steam particularly has been responsible for this. Because of its greater expansion and resulting sustained load on the piston, a much greater load is applied at the top and bottom quarter where the main rod is at its greatest angularity. This forces the crosshead against the top guide (when the engine is going forward) with greater force, and the rigid connection with the piston rod makes the piston rod and head try to follow the movement of the crosshead. Normally this is impossible because the clearance between the crosshead and top guide is greater than the clearance between the piston head and inside cylinder wall. Even if the piston rod and head were free to follow the crosshead, the movement takes place too quickly for the inertia of the piston mass to be overcome, and the result is an oscillating or whipping action of the piston rod with the center of movement at the juncture between the piston rod and crosshead. Even at low speed where the problem of inertia is not vital, the crosshead must lift the entire piston assembly (still assuming the possibility) and this alone places a strain on the piston rod.

Now I have overcome the cause and with it the effect of this condition by introducing a pivotal connection between the crosshead and piston rod, utilizing a specifically valuable construction and improved features which will now be set out in detail.

Referring particularly to Fig. 1, a locomotive engine is shown provided with a cylinder 9, having a reciprocable piston head 11 therein. The piston head is connected, by means of a piston rod 12, to a crosshead 13. The movement of the crosshead is transmitted to the drive wheels 14, through a connecting rod 15, in the usual manner. A packing 18 is employed where the piston rod emerges from the cylinder, this packing being of a special type known in the art to permit relatively greater vertical movement of the piston rod.

Good engineering practice requires that the play between the crosshead and guide members 16 should not exceed three-sixteenths of an inch, and the Interstate Commerce Commission has a requirement that this limit shall not be exceeded. The play between the piston head 11 and cylinder 9 should not exceed one-sixteenth of an inch. This qualifies the statement previously made that the piston is not free to follow the movement of the crosshead.

The crosshead of my invention comprises a pair of shoes 19 and 21, which slidably engage guide bars 16. The shoes are provided with flanges 22 for maintaining them in lateral alignment with the guide bars. Each of these shoes is provided with inwardly extending flanges 23, to which connecting plates or webs 24 are attached by means of bolts 25. The webs 24 are provided with central apertures 26 and 27, which are reinforced by hubs 28 and 29. The apertures 26 and 27 are tapered in the same direction and are adapted to receive a wrist pin 31, having tapered portions coinciding with the tapered portions of the webs, whereby the wrist pin will be rigidly secured within the webs when the pin is drawn tightly into the apertures by means of a nut 32.

The portion of the wrist pin intermediate plates 24 is surrounded by a bushing 33, which makes a journal fit with the wrist pin. The piston rod 12 is provided with a bifurcated end member 34, having a socket 35 at one end for receiving the piston rod. The piston rod and the end member are secured together by means of a key 36, which is forced into aligned slots in the end member and piston rod.

The bifurcated end member is provided with a bearing in each fork and is pivotally mounted upon bushing 33. Connecting rod 15 is provided with a similar bearing, which is pivotally mounted on the bushing 33 intermediate the ends of the bifurcated end of the piston rod.

In order further to instruct those skilled in the art I shall point out some of the advantages of my invention as herein set out. There is of course the major advantage of avoiding strain on and resulting breakage of the piston rod.

The greatest reduction of force is between the wrist pin and its fit in the crosshead, because in the old construction the entire piston load was put on the crosshead and transmitted by it to the wrist pin through the usual tapered fits. This causes very rapid wear and loosening of this connection. In my construction the tapered fits are called upon to carry only the load of moving the crosshead itself back and forth, and also to resist the vertical load due to the angularity of the main drive rod. This reduction in force also makes it possible to construct the crosshead considerably lighter which in itself is productive of obviously good results.

Another advantage is that the piston head can ride at all times on the bottom of the cylinder thereby reducing the wear incident to pounding up and down as heretofore. Moreover the lubricant which is used is always found in greater concentration at the bottom of the cylinder, and the greater amount of lubricant at this contact point in itself tends to reduce wear.

The decreased extra vertical movement of the piston rod is of value because less strain is placed upon the packing 18. This makes for longer packing life and serves other advantages readily apparent.

I wish to call attention to the bushing 33. This is of the so-called floating type, having a journal fit inside and out, and acts like a beam to transmit some of the load of the piston thrust from immediately in line with the tines or forks of the bifurcated connection of the piston rod to the center line between them. On the opposite side of the pin, the bushing tends to transmit some of the resisting load of the front end of the main rod from in direct line with the main rod to the sides in line with the bifurcations of the piston rod. Thus, so far as the horizontal thrusts and pulls are concerned, the loads on the wrist pin itself are very much reduced, and a small wrist pin can be used.

What I claim as new and wish to protect by Letters Patent of the United States is:

1. In a locomotive engine, a crosshead comprising spaced bearing members, a pair of webs interconnecting said members, a removable wrist pin rigidly supported in said webs, a piston rod pivotally secured to said wrist pin, a connecting rod pivotally secured to the wrist pin, and means for guiding the bearing members of said cross head.

2. In a locomotive engine, a crosshead having vertically spaced bearing members, a pair of plates interconnecting said bearing members, bearing members having tapered apertures in said plates, a wrist pin having tapered ends, means for rigidly securing said wrist pin in said bearing members, guide members for guiding said crosshead, and a piston rod pivotally mounted on said wrist pin to permit the crosshead bearing members to flatly engage the guide members without strain in the piston rod.

3. In a locomotive engine, a crosshead having a wrist pin rigidly mounted therein, a floating bushing on said wrist pin, a piston rod pivotally mounted on said bushing, and a connecting rod pivotally mounted on said bushing, whereby the bushing transmits substantially the entire force imparted by the piston rod to the connecting rod.

4. In a locomotive engine, a crosshead, guide means for the crosshead, a piston head and a piston rod for reciprocating the crosshead, a connecting rod for converting the reciprocating motion into rotary motion, thereby producing vertical forces between the crosshead and guide means, a wrist pin for transmitting said vertical forces to the crosshead and not to the piston head, and a bushing on said wrist pin for transmitting forces from the piston rod to the connecting rod.

5. In a locomotive engine, a crosshead having upper and lower bearing surfaces, guide members for said bearing surfaces, a reciprocating piston rod, a connecting rod, a rotary member engaged by one end of said connecting rod and producing vertical forces on said crosshead, a wrist pin in said crosshead for transmitting said vertical forces to the crosshead, said rotary member surrounding said wrist pin and rotatable thereon for interconnecting the piston and connecting rods.

6. In a locomotive engine, a crosshead, a wrist pin rigidly mounted therein, a bushing rotatably mounted on said wrist pin, a piston rod having a bifurcated end pivotally mounted on said bushing, and a connecting rod pivotally mounted on said bushing intermediate the bifurcated end of said piston rod.

7. In a locomotive engine, a crosshead, upper and lower guide members vertically arranged with respect to the crosshead, said crosshead having a pair of vertical plates, a wrist pin rigidly secured in said plates, a bifurcated piston rod pivotally supported on said wrist pin, and a connecting rod pivotally supported on said wrist pin between the ends of said bifurcated piston rod.

8. In a locomotive engine, a cross head, upper and lower guide members vertically arranged with respect to the crosshead, said crosshead having a pair of vertical plates, a wrist pin rigidly secured in said plates, a bushing rotatably mounted on said wrist pin between said plates, a piston rod pivotally mounted on said bushing, and a connecting rod pivotally mounted on said bushing.

In witness whereof, I hereunto subscribe my name this 31st day of May, 1929.

WILLIAM J. SCHLACKS.